(12) United States Patent
Lanka et al.

(10) Patent No.: US 12,417,238 B2
(45) Date of Patent: Sep. 16, 2025

(54) SEMANTIC SEARCH ARCHITECTURE FOR INFORMATION RETRIEVAL WITH NATURAL LANGUAGE QUERIES

(71) Applicant: PayPal, Inc., San Jose, CA (US)

(72) Inventors: Soujanya Lanka, Singapore (SG); Zehong Ma, Shanghai (CN)

(73) Assignee: PayPal, Inc., San Jose, CA (US)

( * ) Notice: Subject to any disclaimer, the term of this patent is extended or adjusted under 35 U.S.C. 154(b) by 339 days.

(21) Appl. No.: 18/302,135

(22) Filed: Apr. 18, 2023

(65) Prior Publication Data

US 2024/0303262 A1    Sep. 12, 2024

(30) Foreign Application Priority Data

Mar. 7, 2023    (WO) ................ PCT/CN2023/079983

(51) Int. Cl.
| | | |
|---|---|---|
| G06F 17/00 | (2019.01) | |
| G06F 16/334 | (2025.01) | |
| G06F 40/30 | (2020.01) | |

(52) U.S. Cl.
CPC .......... *G06F 16/3347* (2019.01); *G06F 40/30* (2020.01)

(58) Field of Classification Search
None
See application file for complete search history.

(56) References Cited

U.S. PATENT DOCUMENTS

| | | | |
|---|---|---|---|
| 8,131,539 B2 | 3/2012 | Liu et al. | |
| 9,703,861 B2 | 7/2017 | Brown et al. | |
| 11,263,245 B2* | 3/2022 | Viswanathan | ....... G01C 21/387 |
| 2006/0235843 A1 | 10/2006 | Musgrove et al. | |
| 2014/0188864 A1 | 7/2014 | Bennett et al. | |
| 2015/0293976 A1* | 10/2015 | Guo | ....... G06N 3/045 707/706 |

(Continued)

FOREIGN PATENT DOCUMENTS

| | | | | |
|---|---|---|---|---|
| CA | 3218249 A1 * | 4/2024 | ........... G06F 16/951 |

OTHER PUBLICATIONS

Omar Khattab et al., "ColBERT: Efficient and Effective Passage Search via Contextualized Late Interaction over BERT," arXiv:2004.12832v2 [cs.IR] Jun. 4, 2020; 10 pages.

(Continued)

*Primary Examiner* — Satwant K Singh
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to operating, by a computer system, a semantic search engine to retrieve records from a data store. The technique includes training, by the computer system using a plurality of training data sets that include queries and corresponding records, a retrieval model for use in the semantic search engine. The technique may further include generating, by the trained retrieval model, a particular output vector representing a received semantic search query, and generating, using the particular output vector, a respective similarity score for ones of candidate records identified in the data store. The trained retrieval model may send the particular output vector to a late interaction model, and the late interaction model may sort, using the particular output vector, candidate records with respective similarity scores that satisfy a threshold score.

20 Claims, 8 Drawing Sheets

(56) References Cited

U.S. PATENT DOCUMENTS

| | | |
|---|---|---|
| 2016/0371379 A1 | 12/2016 | Fang |
| 2018/0052928 A1 | 2/2018 | Liu et al. |
| 2020/0193288 A1* | 6/2020 | Li .......................... G06N 3/045 |
| 2021/0012235 A1* | 1/2021 | Abbas .................... G06N 20/00 |
| 2021/0326371 A1 | 10/2021 | Bui et al. |
| 2021/0357441 A1 | 11/2021 | Zhuo et al. |

OTHER PUBLICATIONS

International Search Report and Written Opinion in PCT Appl. No. PCT/CN2023/079983 mailed Oct. 24, 2023, 8 pages.

* cited by examiner

_600_

Training, by a computer system using first training data that includes queries and known corresponding documents, a retrieval model for inclusion in a semantic search engine executable to retrieve records from a data store, wherein training the retrieval model generates a first revision of the retrieval model.
_610_

Training, by the computer system using second training data, the first revision to generate a second revision of the retrieval model that is usable to produce similar output vectors for input queries that are semantically similar.
_620_

Training, by the computer system using third training data that includes queries and known corresponding records, the second revision to produce a trained retrieval model, wherein training the second revision of the retrieval model attempts to reduce ordering error in candidate record lists predicted by the trained retrieval model.
_630_

In response to receiving a search query:
_640_ generating, by the trained retrieval model, a particular output vector representative of the search query, and
_642_ identifying, by the trained retrieval model using the particular output vector, a list of candidate records from the data store.
_644_

```
┌─────────────────────────────────────────────────────────────┐
│  Receiving, by the computer system, a record to place in    │
│  the data store.                                            │
│                           710                               │
└─────────────────────────────────────────────────────────────┘
                              │
                              ▼
┌─────────────────────────────────────────────────────────────┐
│  Generating a plurality of vector representations for the   │
│  received record, wherein ones of the plurality of vector   │
│  representations correspond to different portions of        │
│  the received record.                                       │
│                           720                               │
└─────────────────────────────────────────────────────────────┘
                              │
                              ▼
┌─────────────────────────────────────────────────────────────┐
│  Estimating a respective similarity between the particular  │
│  output vector and a respective plurality of vector         │
│  representations for a given one of the candidate           │
│  records.                                                   │
│                           730                               │
└─────────────────────────────────────────────────────────────┘
```

*FIG. 7*

SEMANTIC SEARCH ARCHITECTURE FOR INFORMATION RETRIEVAL WITH NATURAL LANGUAGE QUERIES

PRIORITY CLAIM

The present application claims priority to PCT Appl. No. PCT/CN2023/079983, entitled "Semantic Search Architecture for Information Retrieval with Natural Language Queries", filed Mar. 7, 2023, which is incorporated by reference herein in its entirety.

BACKGROUND

Technical Field

Embodiments described herein are related to the field of database queries, and more particularly to techniques for using machine-learning models to train a retrieval model of a semantic search engine.

Description of the Related Art

Typical search engine techniques include lexical searches and semantic searches. Lexical searches may perform a search query using a literal definition of words and phrases included in search string. Lexical searches may not attempt to extract additional meaning from how search terms are organized. Semantic searches, in contrast, may improve search accuracy by understanding the content of the search query. Semantic search may also find synonyms and identify candidate documents based on an underlying meaning within the search query. For example, a natural language search string such as "popular fashion trends" may be interpreted by a lexical search to look for candidate documents that include the three words of the search string (and in some cases, synonyms of one or more of the three words) which may result in candidate documents being identified that are months or even years old. A semantic search, in contrast, may interpret the same search string to request current and or rising fashion trends based on a current date. Older documents may be rated as less likely matches in favor or newer matches, even if newer matches have fewer occurrences of the terms in the search string. Documents related to fashion with recent upwards trends in views may be weighted higher as a match as compared to documents with downward trends in viewing.

Benefits of semantic searches, however, may be accompanied by an increase in computational cost. Semantic searches may use more computational bandwidth than lexical searches, in some cases, using orders of magnitude more bandwidth. This additional bandwidth usage may unfavorably increase latency for returning results to the requestor, resulting in dissatisfaction of the requestor.

BRIEF DESCRIPTION OF THE DRAWINGS

The following detailed description makes reference to the accompanying drawings, which are now briefly described.

FIG. 6 depicts a flow diagram of an embodiment of a method for training a retrieval model for use in a semantic search engine.

FIG. 7 illustrates a flow diagram of an embodiment of a method for receiving and storing a new record in a data store.

DETAILED DESCRIPTION OF EMBODIMENTS

Figure 1:
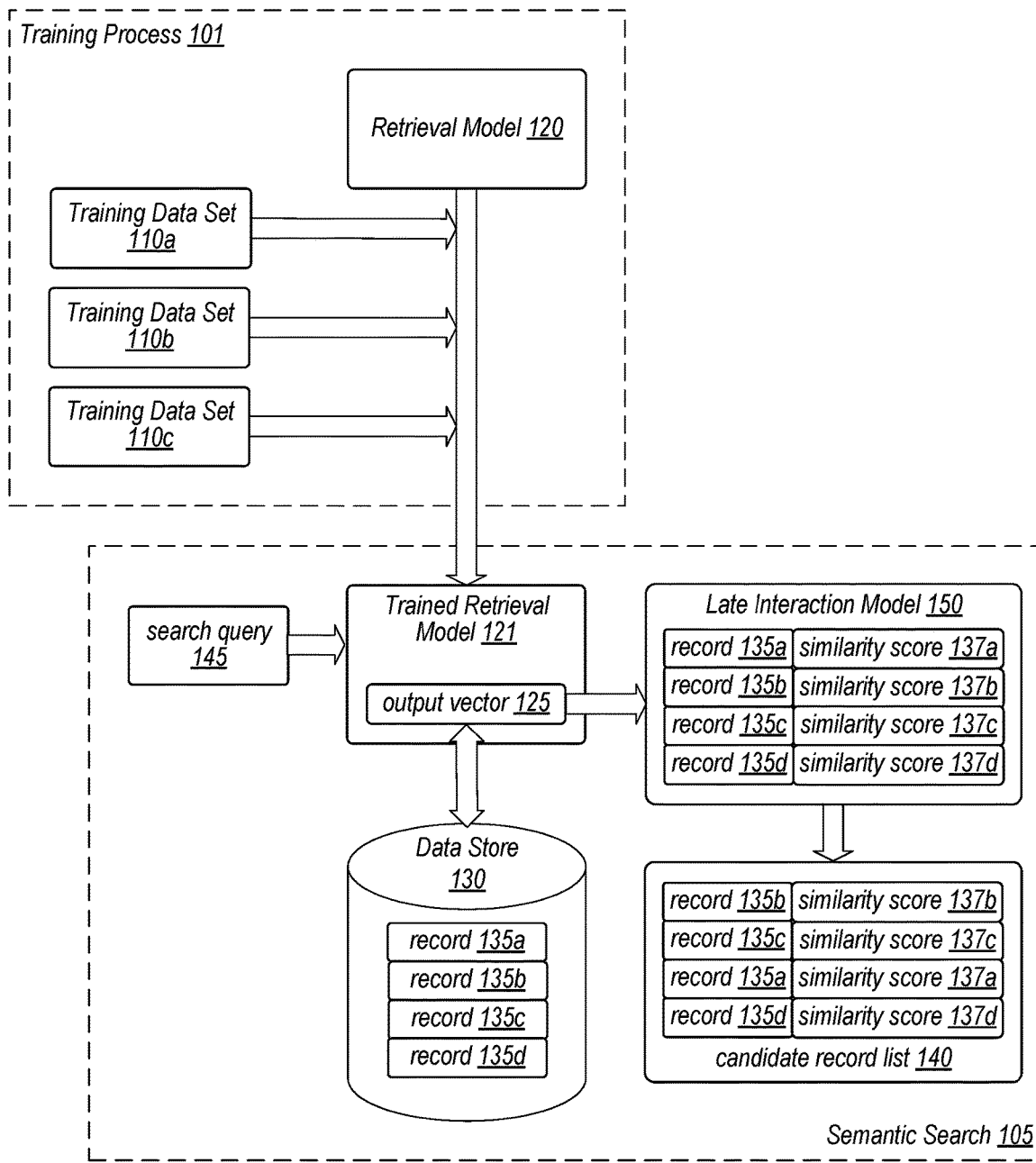
FIG. 1 illustrates a block diagram of an embodiment of a computer system for training a retrieval model for performing semantic searches.

Semantic searches may provide more accurate results than more traditional searches that use lexical interpretations of natural language search strings. The advanced capabilities of semantic searches, however, may consume a much greater amount of a computer system's bandwidth. For example, a typical semantic search engine may utilize a two-step approach that includes a first step of retrieving candidate records and an second step of re-ranking the retrieved records. For a given search query, the retrieval step includes retrieving a particular number of records from a data store that may include a vast number of records. These retrieved records, also referred to as "candidate records," are identified based on their potential relevance to the given search query. In the re-ranking step, the candidate records are assigned a relevancy score based on a respective record's similarity to the given search query. These relevancy scores may then be used to generate a ranked record list that will be presented to the requestor with most likely matches presented first.

The retrieval step may be implemented, in part, as an offline process, in which records in the data store are encoded into a vector representation by a retrieval model. These vector representations may then be stored for later reference, e.g., into an index file using fast vector-similarity data structures. Such an index file may be loaded later during an online retrieval process to conduct a large-scale vector-similarity search in response to a requested search query. A search string included in the requested search query may be encoded into a vector by the retrieval model in the online retrieval process. This query vector may then be used to identify vector representations in the index file that are similar in vector space. The identified vector representations are used to create the initial candidate record list. This process, however, may not provide adequate information for ranking the candidate record list, such that the requestor may be presented with the most likely candidate records first.

Accordingly, the second re-ranking step is performed in order to rank the candidate record list in an order of most-to-least likely matches to the search query. Each of the retrieved candidate records in the candidate record list is compared to the search query. The re-rank model outputs a relevancy score between 0 and 1 indicating how relevant each candidate record is to the search query. The relevancy scores are then used to sort candidate record list. Generation of the candidate list and the re-ranking step are performed online in real-time after receiving a given search query, resulting in all the processing time for these steps delaying a display of results to the requestor. In particular, the re-ranking step may consume a noticeable amount of time, to an annoyance of the requestor. Such a system that supports hundreds, thousands or even millions of users might require immense amounts of computer bandwidth (e.g., via large server farms) or risk providing an unsatisfactory service to the users.

Accordingly, a technique is desired that may reduce the processing overhead of semantic searches while still providing the advantages of semantic searches over traditional search engines. The disclosed techniques may be utilized to train a semantic search engine that can perform semantic searches while reducing an amount of time to process received search queries.

Proposed techniques disclosed herein may enable use of a trained retrieval model for identifying candidate record lists with a great enough accuracy that a compute-intensive re-ranking step can be eliminated. Such a proposed technique may include a computer system that uses a plurality of training data sets to train a retrieval model for use in a semantic search engine. These training data sets may include examples of queries and corresponding records. The trained retrieval model may then generate a particular output vector representing a received semantic search query. The trained retrieval model may then generate, using the particular output vector, respective similarity scores for candidate records identified in the data store. The particular output vector may then be sent, by the trained retrieval model, to a late interaction model. The late interaction model may then sort, using the particular output vector, candidate records with respective similarity scores that satisfy a threshold score. This sorted list may then be presented to the requestor.

Use of such techniques to train and operate a semantic search engine may result in generation of candidate record lists that require little to no re-ranking, thereby reducing an amount of bandwidth consumed for re-ranking steps in conventional semantic search engines. The reduction in bandwidth may, in turn, result in reduced delays for presenting results of a requested search query to the requestor without requiring additional computer bandwidth.

A block diagram for an embodiment of a computer system is illustrated in FIG. 1. As shown, computer system 100 includes retrieval model 120, training data sets 110a-110c (collectively 110), data store 130, and late interaction model 150. Computer system 100, in various embodiments, may be implemented, for example, as a single computer system, a plurality of computer systems in a data center, as a plurality of computer systems in a plurality of data centers, and other such embodiments. In some embodiments, computer system 100 may be implemented as one or more virtual computer systems hosted by one or more server computer systems. Computer system 100 may be included as part of an online service that results in various records 135a-135d (collectively 135) being stored in data store 130, and provides a further service allowing users to search for particular records in data store 130, using a semantic search engine that includes trained retrieval model 121.

Computer system 100 may include one or more processor circuits and a memory circuit that includes instructions that when executed by processor circuit, cause the system to perform operations described herein. As shown, computer system 100 is operable to train, in training process 101 using training data sets 110, retrieval model 120, thereby producing trained retrieval model 121 for use in the semantic search engine. Training data sets 110 may include various queries along one or more corresponding records that are related to the query. As will be disclosed in greater detail below, the training may include several steps and result in retrieval model 120 being capable of generating similarity scores that represent a degree of matching between a received search query and respective ones of records 135.

Data store 130, as shown, includes a plurality of records, including records 135. In some embodiments, data store 130 may include records related to any type of action a user performs while utilizing one or more services provided by computer system 100. For example, computer system 100 may provide services related to electronic exchanges between two or more entities. Such electronic exchanges may include exchanges of media files, online purchases, scientific or educational data, and the like. One or more records may be generated and kept for any action a user performs, including for example, logging into their account, updating their profile, reviewing a status of a most recent exchange, initiating an electronic exchange, accepting/denying an exchange proposed by a different user, and so forth. The records may be stored, in data store 130, for any suitable amount of time. In some embodiments, the amount of time may vary based on one or more parameters, such as available storage space in data store 130, a type of record that was generating, a result of the activity performed, etc.

As illustrated, trained retrieval model 121 receives search query 145, e.g., from a particular user as part of semantic search 105. Trained retrieval model may then generate output vector 125 representing search query 145. Trained retrieval model 121 is trained to perform semantic searches. Accordingly, trained retrieval model 121 considers a search string included in search query 145 as more than just a string of one or more words. The search string may be treated as a phrase in one or more languages and/or dialects in an attempt to extract meaning from the search string as a whole. For example, search query 145 may include a natural language search string such as "list records that include evidence of gift card fraud." A purely lexical search engine may simply look for record in data store 130 that include one or more of each word in the search string, without interpreting the search string as a particular request with constraints. Even in some simpler semantic searches, the search string may misinterpret the phrase "gift card fraud." Trained retrieval model 121 generates output vector 125 to match records in data store 130 that include some form of fraudulent activity associated with gift cards.

Output vector 125, as shown, may include any suitable number of fields, each field related to a particular characteristic that may be found in one or more of the stored records. A value of a given field may represent a degree to which the search string indicates interest in the particular characteristic of the given field. In some embodiments, for example, each field may have a value between '0' and '1' with '0' indicating no interest and '1' indicating a highest level of interest. A given output vector may include tens, hundreds, thousands, or more fields in order to represent the variety information included in the records stored in data store 130. Depending on a given search string, only a few of the many fields may have values greater than '0.'

Trained retrieval model 121, using output vector 125, may generate a respective similarity score (e.g., similarity scores 137a-137d, collectively 137) for ones of candidate records identified in data store 130. As depicted, trained retrieval model 121 compares each of records 135 to output vector 125 and generates a respective similarity score 137. For example, each of records 135 may have a corresponding output vector with the same fields as used in output vector 125. These record output vectors may be generated in response to the corresponding record 135 being stored in data store 130. The record output vectors may also be stored in data store 130 or, in some embodiments, may be stored in a different location, such as a storage device that may be quickly accessed by trained retrieval model 121. Similarity scores 137 may provide an indication as to how well output vector 125 matches the corresponding record output vector for each of records 135.

As shown, trained retrieval model 121 sends output vector 125 to late interaction model 150. Trained retrieval model 121 may also send an initial candidate list that includes records 135 with corresponding similarity scores 137. In some embodiments, the similarity scores 137 may provide enough accuracy that trained retrieval model 121 omits output vector 125 and only sends records 135 and the corresponding similarity scores 137.

Late interaction model 150, as shown, may sort, using output vector 125, ones of candidate records 135 with respective similarity scores 137 that satisfy a threshold score. Accordingly, only records with a particular degree of similarity to search query 145 are included in candidate record list 140. Candidate record list 140 may then be presented to the user who submitted search query 145. If trained retrieval model 121 can generate similarity scores 137 that satisfy a particular level of accuracy, then late interaction model 150 may be capable of sorting similarity scores 137 using less bandwidth of computer system 100 as compared to traditional semantic search engines. Accordingly, delays from the user submitting search query 145 to candidate record list 140 being presented to the user may also be reduced, thereby increasing the user's satisfaction with the search tool without an increase to the bandwidth of computer system 100.

It is noted that computer system 100, as illustrated in FIG. 1, is merely an example. FIG. 1 has been simplified to highlight features relevant to this disclosure. In other embodiments, additional elements that are not shown may be included, and/or different numbers of the illustrated elements may be included. For example, one or more processors and/or memory circuits may be included in computer system 100 to perform and store computer instructions operable to perform retrieval model 120, late interaction model 150, and the operations described herein. Although a single data store is shown, with four records related to the search query, other embodiments may include multiple data stores to be searched and any suitable number of records may be relevant to a given search query.

Figure 2:
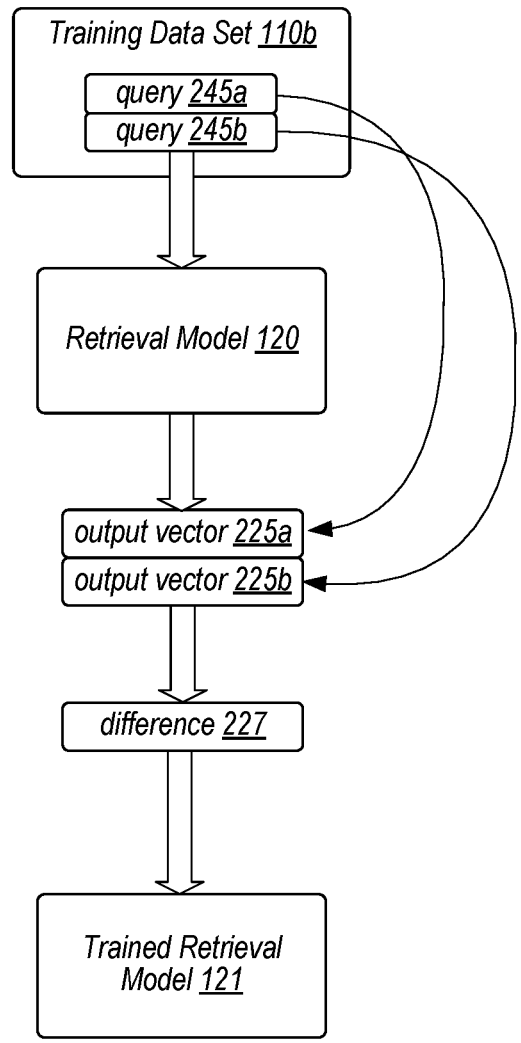
FIG. 2 shows an example of training a retrieval model using a data set with a query-query pair.

The description of FIG. 1 discloses training of a retrieval model for use in a semantic search engine. Training of the retrieval model included use of training data sets that include various search queries and examples of their resulting records. FIG. 2 depicts an example technique for training the retrieval model with such training data.

Moving to FIG. 2, an example of training a retrieval model using training data sets that include a query-query pair is shown. Computer system 100 is shown to include training data set 110b that includes a query-query pair of query 245a and query 245b. Computer system 100 trains retrieval model 120 using training data set 110b to generate trained retrieval model 121.

In the illustrated example, training data set 110b, one of a plurality of training data sets that may be used to train retrieval model 120, includes a plurality of positive query-query pairs, including queries 245a and 245b. As used herein, a "positive query-query pair" includes two queries that produce similar lists of candidate records. For example, a query that includes a search string of "which records are related to encryption?" may have results that significantly overlap with a different query that includes a search string of "techniques for securing private data" as encryption is commonly used for securing private data. Although these two search strings have no common terms, they may produce very similar results when used to search records in a data store, such as data store 130. Accordingly, it may be desirable to train retrieval model 120 to recognize different search phrases that result in similar candidate record lists.

Training retrieval model 120 using training data set 110b includes generating, by retrieval model 120, output vectors 225a and 225b for queries 245a and 245b, respectively. As disclosed, queries 245a and 245b represent a given one of the positive query-query pairs in training data set 110b, and therefore, should produce similar search results. Computer system may compare output vectors 225a and 225b to determine difference 227 between the respective output vectors. For queries 245a and 245b to produce similar search results, output vectors 225a and 225b should be similar. As described above, an output vector of a given query is used to identify and rank candidate records from data store 130. Accordingly, similar output vectors should correspond to similar candidate records.

As shown, computer system 100 revises retrieval model 120 based on difference 227, resulting in trained retrieval model 121. If difference 227 is low, e.g., below a particular threshold, then output vectors 225a and 225b are similar and little to no adjustments may be needed to retrieval model 120. If, however, difference 227 is greater than a threshold, then retrieval model 120 may be revised to increase recognition of similarities between queries 245a and 245b. Such revisions may result in a reduction of difference 227 if output vectors 225a and 225b are regenerated using trained retrieval model 121.

This training process may be repeated for hundreds, thousands, tens of thousands, or more positive query-query pairs. A greater number of positive query-query pairs used in the training process may result in trained retrieval model 121 having an increased ability to deduce semantic meaning from received queries. The positive query-query pair training may teach trained retrieval model 121 how to infer similar meanings from different phrases that are directed towards similar topics. Accordingly, such training may result in trained retrieval model 121 being capable of generating similar output vectors for different search queries that have very different search terms, provided that the underlying meaning of the different search queries are similar.

It is noted that the embodiment of FIG. 2 is merely an example to demonstrate the disclosed concepts. Although a single positive query-query pair is shown, any suitable number of positive query-query pairs may be included in other embodiments. One or more intermediate retrieval models (not shown) may be generated during an iterative training process in which a plurality of positive query-query pairs is used for training.

Figure 3:
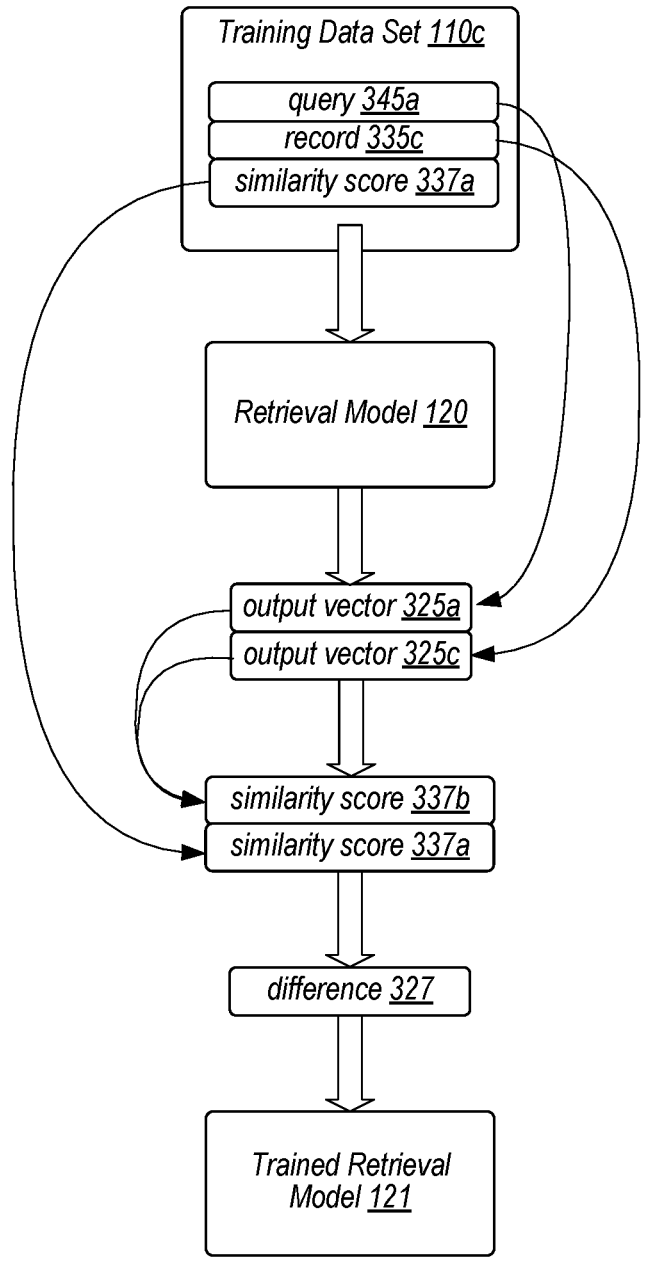
FIG. 3 depicts an example of training a retrieval model using a data set with a query-record pair.

As previously stated, the description of FIG. 1 discloses training of a retrieval model using training data sets that include various search queries and examples of their resulting records. FIG. 2 illustrated a training example that uses a query-query pair. FIG. 3 shows an example of a training technique that uses a query-record pair.

Turning to FIG. 3, an example of training a retrieval model using a training data set that includes a positive query-record pair is shown. Computer system 100 is shown to include training data set 110c that includes a positive query-record pair along with a corresponding similarity score. The positive query-record pair includes query 345a and corresponding record 335c that is an example of a positive match for query 345a. Similarity score 337a is indicative of an expected similarity score to be generated by a trained retrieval model. In a similar manner to FIG. 2, computer system 100 trains retrieval model 120 using training data set 110c to generate trained retrieval model 121.

As shown, training data set 110c is one of a plurality of training data sets that may be used to train retrieval model 120. Training data set 110c includes a plurality of positive query-record pairs, including query 345a and record 335c. As used herein, a "positive query-record pair" includes a record that is exemplary of a result of a corresponding query in the pair. Returning to the example of FIG. 2, the query that includes the search string of "which records are related to encryption?" may match a record that was generated in response to a password change by a user, the password change resulting in a new password being encrypted. Similarity score 337a indicates a level of similarity between query 345a and record 335c. As previously disclosed, similarity scores may have a value between zero and one, with one indicating a strong similarity and zero indicating no similarity. Accordingly, a similarity score of 0.8 may indicate a reasonably strong correlation between query 345a and record 335c, while a similarity score of 0.3 may indicate that record 335c has a low correspondence to query 345a. For positive query-record pairs, a similarity threshold may be set such that only query-record pairs with similarity scores greater than or equal to, e.g., 0.6 are included. In some embodiments, it may be desirable to train retrieval model 120 across a range of similarity scores to teach retrieval model 120 different levels of similarity. In other embodiments, it may be desirable to set a higher threshold, such as 0.85, to train retrieval model 120 to identify strong relationships.

Computer system 100 may cause retrieval model 120 to generate, using query 345a and record 335c, output vector 325a based on query 345a and output vector 325c based on record 335c. As described above, the respective output vectors include a plurality of fields corresponding to respective characteristics that may be found in records to be searched. After output vectors 325a and 325c have been generated, computer system 100 may cause retrieval model 120 to generate similarity score 337b based on output vector 325a and output vector 325c. Accordingly, similarity score 337b represents a level of similarity between query 345a and record 335c as observed by retrieval model 120.

As illustrated, computer system 100 compares similarity score 337b to the predetermined similarity score 337a for the positive query-record pair. Computer system 100 determines difference 327 between the expected similarity score 337a and similarity score 337b determined by retrieval model 120. Computer system 100 may then revise retrieval model 120 based on difference 327, thereby generating trained retrieval model 121. If retrieval model 120 is well trained, then difference 327 will be small, and little to no changes may be made to retrieval model 120. In contrast, a large difference may indicate that retrieval model 120 is poorly trained on the subject matter of query 345a and record 335c and, in response, provide revisions that may improve the retrieval model's performance in a subsequent iteration.

In a manner as described above, the training process may be repeated for hundreds, thousands, tens of thousands, or more positive query-record pairs. Such training may result in trained retrieval model 121 being capable of generating similar output vectors for search queries and relevant records.

It is noted that FIG. 3 is an example to demonstrate the disclosed concepts. Only elements needed to illustrate these concepts are shown. Although FIG. 3 is depicted with retrieval model 120 being trained, in some embodiments, the training process of FIG. 2 may be performed first, creating an interim retrieval model. This interim training model may then be trained using the process depicted in FIG. 3. In other embodiments, this process may be reversed, with the process of FIG. 3 being performed first, followed by the process of FIG. 2. In some embodiments, the training processes of FIGS. 2 and 3 may be performed in parallel, with the improvements from each process combined into a single trained retrieval model 121.

Figure 4:
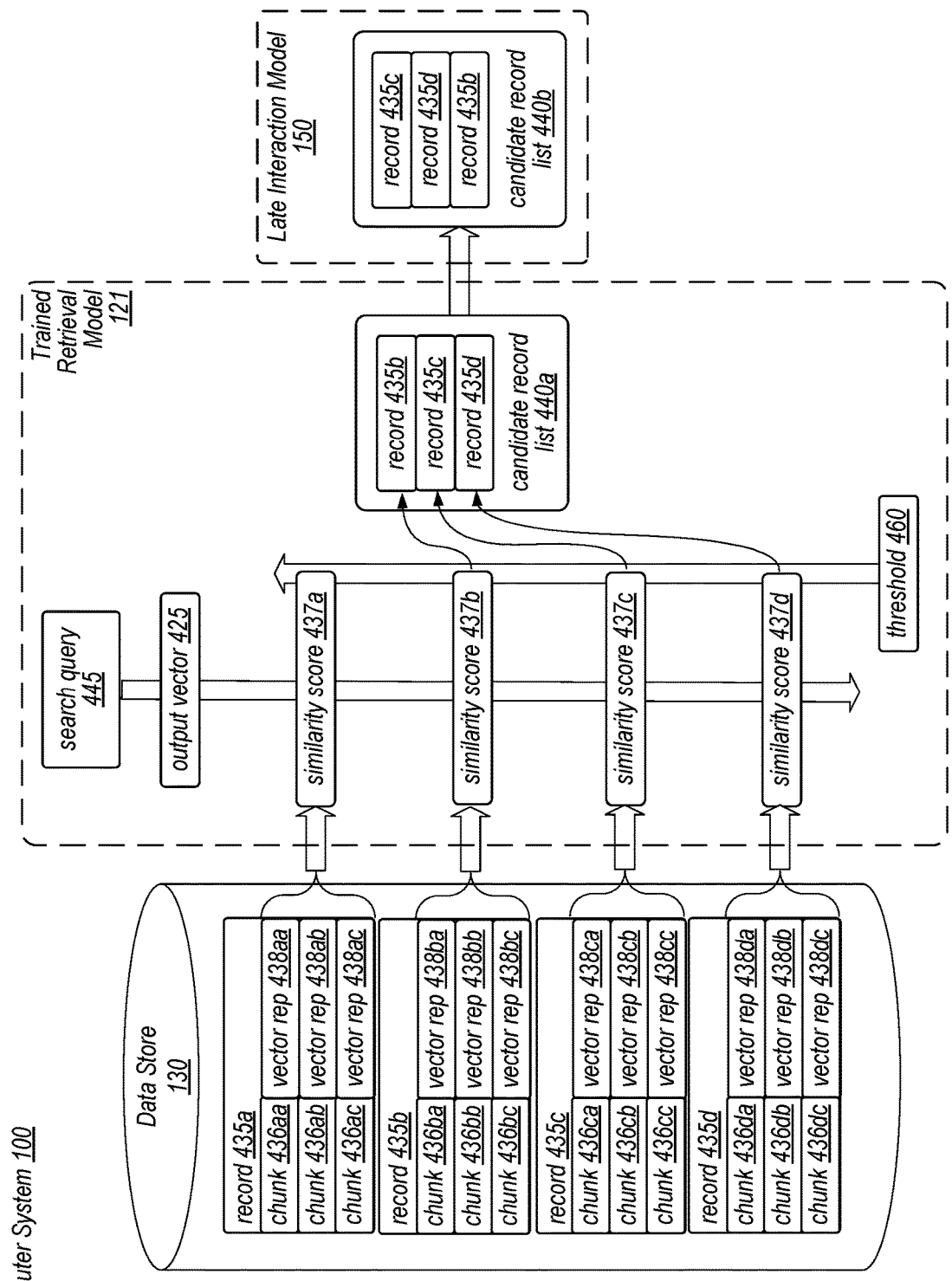
FIG. 4 illustrates an example of performing a semantic search using a trained retrieval model.

The description of FIGS. 2 and 3 disclose training techniques for training a retrieval model for use in a semantic search engine. Once trained, this retrieval model may be used to identify relevant records to a given search query. FIG. 4 depicts such an example.

Proceeding to FIG. 4, a block diagram of a computer system that may be used to perform a semantic search of a data store is depicted. Computer system 100 includes data store 130 which, in turn, includes a plurality of records such as records 435a-435d (collectively 435). Computer system 100 is operable to perform search query 445 using trained retrieval model 121 and late interaction model 150 to generate candidate record list 440b. To perform the semantic search, computer system 100 may include a computer-readable, non-transient memory including instructions that when executed by computer system 100, cause computer system 100 to perform the operations described below in reference to FIG. 4.

As described above, computer system 100 uses a plurality of training data sets that include queries and corresponding records to train a retrieval model for use in a semantic search engine. After training, computer system 100 receives, for the semantic search engine, search query 445 to retrieve records from data store 130. Search query 445 is received from a requestor (e.g., a user of services provided by computer system 100) and may include a search string that includes one or more terms corresponding to information associated with records that the requestor wishes to identify. In some embodiments, the search string may include a phrase, such as a statement or question, related to the desired records.

Data store 130 may, for example, include thousands, millions, or more records associated with a variety of activities performed by a plurality of users of computer system 100. A portion of these records may be associated with, e.g., users logging into their respective accounts on computer system 100. Search query 445 may include search strings such as "how many failed login attempts occurred last month?" or "find records that include failed login attempts." Trained retrieval model 121 may attempt to interpret semantic meanings from such search strings.

As illustrated, trained retrieval model 121 generates output vector 425 representing search query 445. As previously disclosed, output vector 425 may include a plurality of numeric elements, each element representative of a characteristic that may be found in one or more records in data store 130. Each numeric element may have a range of valid values, with values at one end of the range indicative of no interest by the requestor in the represented characteristic and values at the other end of the range indicative of a very strong interest of the requestor in the represented characteristic. How many characteristics are represented in output vector 425 may depend, for example, on how varied are the topics of records stored in data store 130. For example, if data store 130 only stores records associated with electronic exchanges, then output vector 425 may only include tens to hundreds of characteristics to sufficiently describe the stored records. In contrast, if data store 130 holds records from a wide variety of topics, then output vector 425 may include thousands, or even tens of thousands of numeric elements representing a wide variety of characteristics.

For example, trained retrieval model 121 attempts to interpret semantic meanings from search query 445 and based on the interpreted meaning, generate values for ones of the characteristics included in output vector 425. Returning to the example search strings above, trained retrieval model 121 may interpret that the requestor is interested in records associated with failed login attempts and, therefore, will set values for the various numeric elements of output vector 425 accordingly. A particular numeric value in output vector 425 may correspond to account login operations and this particular numeric value would be set to a value indicative of high interest. A different numeric value may be associated with successful operations and this different value would be set to a value indicative of little to no interest to the requestor, thereby indicating the requestor is interested in operations that failed.

Trained retrieval model 121 may identify, using output vector 425, a list of candidate records in data store 130. As illustrated, trained retrieval model 121 generates similarity scores 437a-437d for records 435a-435d, respectively. Similarity scores 437a-437d may be generated based on output vector 425 and a corresponding vector representation for each of records 435a-435d. For example, trained retrieval model 121 may generate a respective vector representation for a given record when the given record is sent to data store 130 for storage. Such a vector representation may be generated before or after the given record is stored in data store 130.

In some embodiments, in response to receiving a particular record (e.g., record 435a) to place in data store 130, trained retrieval model 121 generates a plurality of vector representations (vector representations 438aa-438ac) for the received record 435a. Ones of vector representations 438aa-438ac correspond to different portions of the received record, e.g., chunks 436aa-436ac, respectively. A given record may include a variety of information cover a broad range of topics. For example, records 435 may correspond to documents, each potentially having a plurality of paragraphs, figures, charts, etc. By dividing records 435 into respective sets of chunks, a finer granularity towards the characteristics included in each of records 435 may be maintained. A single record may have one out of six sections that includes details regarding encryption. Evaluated as a whole document, a corresponding vector representation may weight encryption characteristics modestly, thereby resulting in a low-to-mid correlation with queries searching for encryption records. Using vector representations of chunks of the records rather than entire documents may increase the weights of encryption characteristics for a vector representation of a particular chunk that includes the section, thereby resulting in a strong match between the particular chunk and a given output vector.

Trained retrieval model 121, as shown, estimates a respective similarity between output vector 425 and respective vector representations for ones of potential candidate records 435. For example, similarity score 437a is determined based on a comparison of output vector 425 and vector representations 438aa-438ac for record 435a. Similarity score 437a may, for example, indicate a degree of correlation between ones of the numeric elements of each of vector representations 438aa-438ac and the corresponding numeric elements of output vector 425. In some embodiments, e.g., corresponding numeric elements that are high for both output vector 425 and vector representation 438aa may result in an increased value of similarity score 437a, while corresponding numeric elements that are high for output vector 425 but low for vector representation 438aa (or vice versa) may not increase or may decrease similarity score 437a. In such an embodiment, a higher value of similarity scores indicates an increased similarity between a given search query and a given record. In other embodiments, similarity scores may be determined differently, resulting in lower values indicating higher degrees of similarity.

In a like manner, similarity scores 437b, 437c, and 437d are determined for records 435b-435d using the respective sets of vector representations and output vector 425. Trained retrieval model 121 may then select records 435b, 435c, and 435d as candidate records based on similarity scores 437b-437d satisfying threshold score 460. Similarity score 437a, as shown, does not satisfy threshold score 460. Accordingly, trained retrieval model 121 includes records 435b-435d in candidate record list, while record 435a is excluded. It is noted that any suitable technique may be used to determine threshold 460. Threshold 460 may be set to a fixed value, or may be determined dynamically, e.g., based on an average of similarity scores 437 and selected to allow a particular number or percentage of records 435 to be selected for candidate record list 440a.

In some embodiments, trained retrieval model 121 may pre-screen some records included in data store 130 before generating a corresponding similarity score. For example, data store 130 may hold tens of thousands or more records. Rather than generating a similarity score for every stored record, trained retrieval model 121 may filter out records that do not have at least one common characteristic of interest as indicated by output vector 425. Records 435, therefore, may be included in a filtered set of records that have a threshold value for at least one characteristic that is indicated as being of interest to the requestor. Respective similarity scores may then be determined for the records of the filtered set. In other embodiments, similarity scores may be determined for all records in data store 130.

As used herein, "satisfying a threshold" refers to a particular value meeting a particular constraint established by a threshold value. In various embodiments, the constraint may correspond to the particular value being, for example, greater than, greater than or equal to, less than, than or equal to, equal to, or not equal to. In some embodiments, two or more different threshold values may be used with a combination of constraints.

After an initial candidate record list 440a is generated, trained retrieval model 121 may send records 435b-435d, along with the respective similarity scores 437b-437d to late interaction model 150. In addition, trained retrieval model 121 may send output vector 425 to late interaction model 150. Late interaction model 150, as shown receives this information and uses similarity scores 437a-437d, along with output vector 425 to sort candidate record list 440a based on estimated similarity to output vector 425, thereby generating candidate record list 440b. This sorting includes re-ranking candidate record list 440a based on values of the respective similarity scores 437a-437d generated by trained retrieval model 121 to create candidate record list 440b. As sent, trained retrieval model 121 may list records 435b-435d randomly or, in some embodiments, in an initial order that is based on a value of the respective similarity scores 437b-437d. Late interaction model 150 may be trained to identify additional correlation between output vector 425 and similarity scores 437b-437d. Additional correlations may, in turn, provide a more accurate order for ranking of records 435b-435d. In some embodiments, late interaction model 150 may include additional evaluation of output vector 425 with corresponding vector representations 438 for one or more of records 435b-435d. In other embodiments, similarity scores 437 may provide sufficient information for re-ranking records 435b-435d. The re-ranked candidate record list 440b may then be presented to the requestor, allowing the requestor to select one or more of records 435b-435d for further use.

It is noted that improved training of trained retrieval model 121 may result in trained retrieval model 121 being able to better interpret search query 445 as compared to traditional training techniques. An accurate interpretation of search query 445 by trained retrieval model 121 may result in more accurate values being generated for output vector 425. In turn, increased accuracy of output vector 425 results in trained retrieval model 121 generating more accurate values for similarity scores 437. Furthermore, generation of vector representations 438 for chunks 436 of the stored records 435, in contrast to a single vector representation for a given record, may also contribute to generation of more accurate similarity scores 437.

Increased accuracy in generating similarity scores 437 may result in a better chance at not only selecting records 435 in which the requestor is most interested, but also in being able to order the records 435 in candidate record list 440a such that those of most potential interest to the requestor are, e.g., at the top of the list. Increased accuracy in the order of records 435 in candidate record list 440a may, in turn, result in less processing time for late interaction model 150 to re-rank the order to generate candidate record list 440b. The reduction in processing time may result in less wait time for the requestor to receive search results and an increase in the requestor's satisfaction with the search engine.

It is noted that the embodiment of FIG. 4 is merely an example. Illustrated elements have been limited for clarity. Although only four records are shown in in data store 130, any suitable number of records may be included, and each record may be divided into any suitable number of chunks, including different numbers of chunks for different records. Similarly, although three records are illustrated in the candidate record list, any suitable number of records may be included in a given candidate record list.

Figure 5:
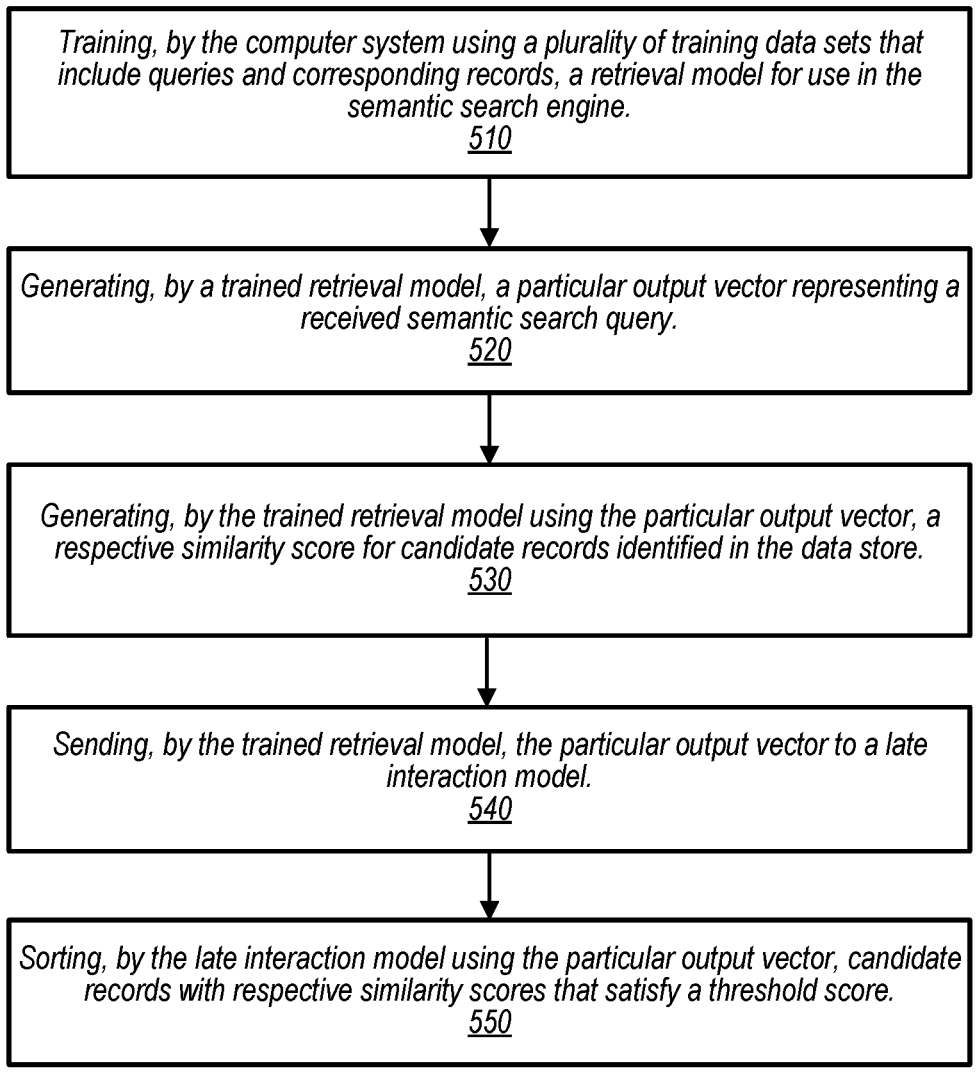
FIG. 5 shows a flow diagram of an embodiment of a method for using a retrieval model for use in a semantic search engine.

FIGS. 1-4 describe various techniques for training and utilizing a retrieval model of a semantic search engine in a computer system. The described techniques may be performed using a variety of methods. FIGS. 5-7 demonstrate three such methods.

Moving now to FIG. 5, a flow diagram for an embodiment of a method for training and operating a retrieval model as part of a semantic search is shown. Method 500 may be performed by a computer system such as computer system 100 in FIGS. 1-4. For example, computer system 100 may include (or have access to) a non-transient, computer-readable memory having program instructions stored thereon that are executable by computer system 100 to cause the operations described with reference to FIG. 5. Method 500 is described below using computer system 100 of FIG. 1 as an example. References to elements in FIG. 1 are included as non-limiting examples.

Method 500 begins at 510 with training, by the computer system using a plurality of training data sets that include queries and corresponding records, a retrieval model for use in a semantic search engine. As shown in FIG. 1, computer system 100 may train, using training data sets 110, retrieval model 120 to produce trained retrieval model 121 for use in the semantic search engine. Training data sets 110 may include various examples of search queries as well as one or more corresponding records. Some of these training queries may be paired with one or more other queries that produce a similar candidate record list. A pair of associated queries producing similar search results forms a positive query-query pair that may be used to train retrieval model 120 to recognize different phrases that correspond to similar requests. As disclosed above, the training may include several steps and result in retrieval model 120 being capable of generating similarity scores that may be used to determine how well respective ones of records 135 correspond to search query 145.

At 520, method 500 continues with the trained retrieval model generating a particular output vector representing a received semantic search query. As shown above, trained retrieval model 121 receives search query 145, and generates output vector 125 as a numeric representation of search query 145. Trained retrieval model 121 is trained to perform semantic searches and, therefore, considers a contextual meaning of a search string included in search query 145 rather than a simple string of one or more words. Trained retrieval model 121 attempts to interpret meaning from search query 145 and generates output vector 125 according to the interpreted meaning. Output vector 125 includes a plurality of fields, each field corresponding to a particular attribute that may be found in one or more records kept in data store 130.

Method 500 proceeds to 530 with the trained retrieval model generating, using the particular output vector, a respective similarity score for ones of candidate records identified in the data store. As depicted, trained retrieval model 121 may compare each of records 135 to output vector 125 and generate a respective one of similarity scores 137. As described above, each of records 135 may have a corresponding output vector with fields corresponding to those included in output vector 125. Similarity scores 137 may indicate how well the fields of output vector 125 match the corresponding fields of the record output vector for each of records 135. As previously described, records from data store 130 may be prescreened prior to generating a similarity score such that similarity scores are only generated for those records 135 that have, for example, at least a threshold level of similarity. Such prescreening may reduce a computing overhead associated with generating similarity scores.

At 540, method 500 continues with the trained retrieval model sending the particular output vector to a late interaction model. As shown, trained retrieval model 121 sends output vector 125 to late interaction model 150 and may further send an initial candidate list that includes records 135 as well as corresponding similarity scores 137. Similarity scores 137, in some cases, may provide sufficient accuracy such that trained retrieval model 121 omits output vector 125 and only sends records 135 and the corresponding similarity scores 137.

Method 500 proceeds to 550 with the late interaction model sorting, using the particular output vector, candidate records with respective similarity scores that satisfy a threshold score. Late interaction model 150, as shown, may sort, using output vector 125, ones of candidate records 135 with respective similarity scores 137 that satisfy a threshold score. Accordingly, only records with a particular degree of similarity to search query 145 are included in candidate record list 140. Candidate record list 140 may then be presented to the user who submitted search query 145. The sorting may include ranking the candidate records based on values of similarity scores 137, as long as trained retrieval model 121 can generate similarity scores 137 that satisfy a particular level of accuracy. Late interaction model 150 may, therefore, be capable of sorting similarity scores 137 using less bandwidth of computer system 100 as compared to traditional semantic search engines. Additionally, an elapsed time from the user submitting search query 145 to when candidate record list 140 is presented to the user may be reduced. Users' satisfaction with the semantic search tool of computer system 100 increase accordingly.

It is noted that the method of FIG. 5 includes elements 510-550. Method 500 may end in 550 or may repeat some or all elements of the method. For example, method 500 may return to 520 to process a subsequent search query. In some cases, method 500 may be performed concurrently with other instances of the method. For example, multiple instances of method 500 may be performed concurrently to process a plurality of received search queries.

Moving to FIG. 6, a flow diagram for an embodiment of another method for training a retrieval model to be used in a semantic search engine is shown. Method 600 may be performed by a computer system such as computer system 100 in FIGS. 1-4. In a similar manner as described for method 500, computer system 100 may include (or have access to) a non-transient, computer-readable memory having program instructions stored thereon that are executable by computer system 100 to cause the operations described with reference to FIG. 6. Method 600 is described below using elements of computer system 100 of FIGS. 1-3 as non-limiting examples.

Method 600 begins at 610 by training, by a computer system using first training data that includes queries and known corresponding documents, a retrieval model for inclusion in a semantic search engine executable to retrieve records from a data store, wherein training the retrieval model generates a first revision of the retrieval model. As shown in FIG. 1, computer system 100 may train retrieval model 120 using training data set 110a. In some embodiments, training data set 110a may include a standardized set of training data that may be used to for training various models, including retrieval model 120. Such a training data set may include an assortment of search strings associated with queries as well as one or more corresponding records that are relevant to one or more search strings of the assortment. In other embodiments, training data set 110a may not include specific search query and result data, but rather it may include an assortment of terms and corresponding indications of similarities to other terms in training data set 110a. Such a training data set may be used to build a vocabulary of retrieval model 120.

At 620, method 600 continues by training, by the computer system using second training data, the first revision to generate a second revision of the retrieval model that is usable to produce similar output vectors for input queries that are semantically similar. Computer system 100 may use training data set 110b to further train the first revision. As illustrated in FIG. 2, training data set 110b includes sets of positive query-query pairs, wherein a given positive query-query pair includes query 245a and query 245b that both produce similar candidate lists. Queries 245a and 245b may include different terms within their respective search strings, but both search strings are related to similar topics. For the positive query-query pair that includes queries 245a and 245b, the first revision of retrieval model 120 generates output vectors 225a and 225b for queries 245a and 245b, respectively. The training includes comparing output vector 225a to output vector 225b to determine difference 227. Since queries 245a and 245b are related to similar topics, retrieval model 120, when suitably trained, should generate output vectors 225a and 225b such that difference 227 is small. Accordingly, computer system 100 may modify retrieval model 120 to generate the second revision of retrieval model 120 (e.g., trained retrieval model 121) based on the first revision and difference 227. A larger difference 227 for example, may result in significant modifications, and vice versa.

Method 600 proceeds in 630 with the computer system training, using third training data that includes queries and known corresponding records, the second revision to produce a trained retrieval model. In some embodiments, training the second revision of the retrieval model attempts to reduce ordering error in candidate record lists predicted by the trained retrieval model. As shown in FIG. 3, the second revision of retrieval model 120, using training data set 110c, generates similarity score 337b using a given positive query-record pair (e.g., query 345a and record 335c). As previously disclosed, a positive query-record pair includes an example of a search query and a corresponding record that matches one or more topics related to the search query. Similarity score 337b is generated based on output vector 325a generated for query 345a and output vector 325c for known corresponding record 335c. Computer system 100 may then compare similarity score 337b to a predetermined similarity score 337a for the given positive query-record pair in order to determine difference 327. Similarity score 337a, for example, may be included in training data set 110c with query 345a and record 335c as a predetermined positive query-record pair. Trained retrieval model 121 may be generated based on the second revision of retrieval model 120 and difference 327. In a manner similar to operation 620, a size of difference 327 may relate to an amount of modification to the second revision of retrieval model 120. A small difference corresponds to retrieval model 120 accurately determining similarity score 337b. A large difference, in contrast, may require more significant modifications in order to train retrieval model 120 to generate a more accurate value for similarity score 337b.

At 640, method 600 continues by receiving a search query. After completing the training, trained retrieval model 121 may be put into operation with a semantic search engine. In response to receiving search query 145, method 600, as shown, performs two operations. At 642, method 600 proceeds with the trained retrieval model generating a particular output vector representative of the search query. As shown in FIG. 1, trained retrieval model 121 generates output vector 125 with values that represent a semantic interpretation of search query 145.

At 644, also in response to the receiving of search query 145, method 600 continues with the trained retrieval model identifying, using the particular output vector, a list of candidate records from the data store. Trained retrieval model 121, as illustrated in FIG. 1, may search data store 130 to identify one or more records 135 that have a threshold level of relevance to search query 145. For example, identifying the list of candidate records may include generating, by trained retrieval model 121 using output vector 125, respective similarity scores 137 for ones of the candidate records 135. Either included within data store 130 or located elsewhere and indexed to records in data store 130, each of records 135 may have respective output vectors that have fields corresponding to fields in output vector 125. Respective values for these fields are used to determine the respective similarity scores 137.

It is noted that the method of FIG. 6 includes elements 610-644. Method 600 may end in 644 or may repeat some or all elements of the method. For example, method 600 may repeat one or more of operations 610-630 for a plurality of iterations, until a desired level of training has been established. In some cases, method 600 may be performed concurrently with other instances of the method. For example, different instances of method 600 may perform operation 640 for respective received search queries.

Turning to FIG. 7, a flow diagram for an embodiment of a method for receiving a record to be stored in a data store that is searchable by a semantic search engine is depicted. In a similar manner as described for methods 500 and 600, method 700 may be performed by a computer system, e.g., computer system 100 in FIGS. 1-4, to cause the operations described with reference to FIG. 7. Method 700 is described below using elements of computer system 100 of FIG. 4 as non-limiting examples.

Method 700 begins at 710 with a computer system receiving a record to place in the data store. For example, computer system 100 may receive a record 435*d* for storage in data store 130. In other embodiments, however, record 435*d* may be stored by a different computer system into data store 130. Computer system 100, in response to the new record 435*d*, may perform a process to analyze record 435*d* such that record 435*d* may be included as a possible result for future semantic searches.

At 720, method 700 proceeds with the computer system generating a plurality of vector representations for the received record. As shown in FIG. 4, vector representations (rep) 438*da*-438*dc* are generated to provide a numeric representation of record 435*d*. Ones of vector representations 438*da*-438*dc* correspond to different ones of chunks 436*da*-436*dc* of record 435*d*. Rather than (or in some embodiments, in addition to) generating a single output vector to represent record 435*d* as a whole, record 435*d* is divided into chunks 436*da*-436*dc*, and a respective one of vector representations 438*da*-438*dc* is determined for each chunk. Chunks 436*da*-436*dc* may correspond to sections, pages, tables, figures, lines, or any other suitable portion of a given record. By dividing a given record into chunks and assigning a respective vector representation of each chunk, the stored records may be processed with a finer resolution than using a single vector representation for the entire record.

Method 700 proceeds to 730 with the computer system estimating a respective similarity between the particular output vector and a respective plurality of vector representations for a given one of the candidate records. For example, in response to search query 445, computer system 100 may use trained retrieval model 121 to generate similarity score 437*d* for record 435*d* using one or more of vector representations 438*da*-438*dc* and output vector 425 that represents search query 445. Any suitable method may be utilized to generate similarity score 437*d*. In some embodiments, for example, output vector 425 ay be compared to each of vector representations 438*da*-438*dc* to generate three separate similarity scores. A similarity score that indicates a strongest match to output vector 425 may then be used as similarity score 437*d*. In such an embodiment, search query 445 would only need to be relevant to a single chunk of record 435*d* for record 435*d* to be included as a candidate record. In other embodiments, a single similarity score may be generated using all vector representations 438*da*-438*dc*. For example, if a portion of output vector 425 corresponds to a portion of vector representation 438*da*, while different portions of output vector 425 correspond to respective portions of vector representations 438*db* and 438*dc*, then similarity score 437*d* may be generated with a value that indicates a strong relevance of record 435*d* to search query 445, even if chunks 436*da*-436*dc*, taken individually, only have a moderate relevance to search query 445. Record 435*d* may, in its entirety, be relevant to search query 445 and therefore is included as a candidate record.

It is noted that method 700 of FIG. 7 includes elements 710-730. Method 700 may end in 730. In some embodiments, some or all of method 700 may be included within methods 500 and/or 600, such as within operations 530 and 644, respectively. Method 700 may repeat some or all elements of the method. For example, method 700 may repeat operations 710 and 720 for a plurality of records that are received for storage.

Figure 8:
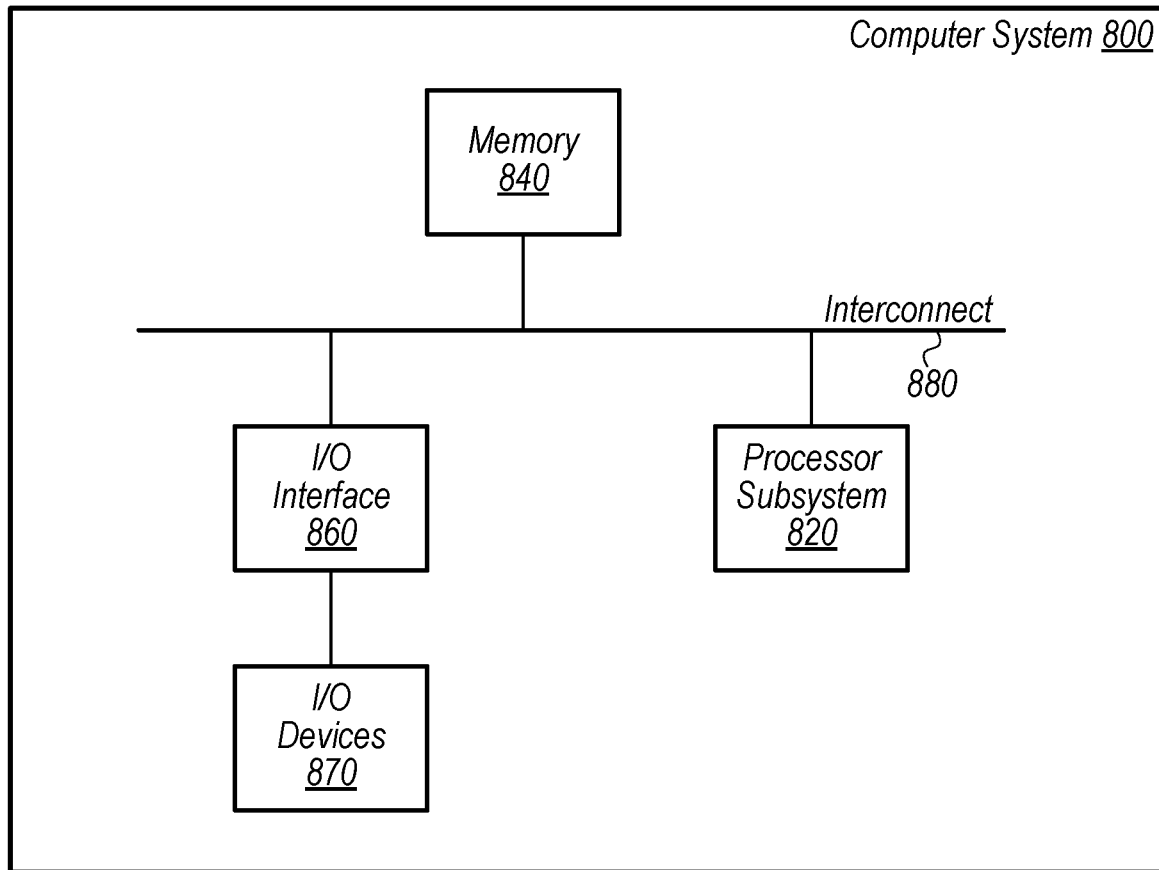
FIG. 8 shows a block diagram of an embodiment of a computer system that may be used to implement one or more embodiments of the disclosed system.

In the descriptions of FIGS. 1-7, various embodiments of a computer system for implementing the disclosed techniques have been disclosed, such as computer system 100 in FIGS. 1-4. The computer system may be implemented in a variety of manners. FIG. 8 provides an example of a computer system that may correspond to one or more of the disclosed systems.

Referring now to FIG. 8, a block diagram of an example computer system 800 is depicted. Computer system 800 may, in various embodiments, implement one or more disclosed computer systems, such as computer system 100. Computer system 800 includes a processor subsystem 820 that is coupled to a system memory 840 and I/O interfaces(s) 860 via an interconnect 880 (e.g., a system bus). I/O interface(s) 860 is coupled to one or more I/O devices 870. Computer system 800 may be any of various types of devices, including, but not limited to, a server computer system, personal computer system, desktop computer, laptop or notebook computer, mainframe computer system, server computer system operating in a datacenter facility, tablet computer, handheld computer, smartphone, workstation, network computer, connected vehicle, etc. Although a single computer system 800 is shown in FIG. 8 for convenience, computer system 800 may also be implemented as two or more computer systems operating together, e.g., as a virtual computer system.

Processor subsystem 820 may include one or more processor circuits. In various embodiments of computer system 800, multiple instances of processor subsystem 820 may be coupled to interconnect 880. In various embodiments, processor subsystem 820 (or each processor unit within 820) may contain a cache or other form of on-board memory.

System memory 840 is usable to store program instructions executable by processor subsystem 820 to cause computer system 800 perform various operations described herein, including, for example, any of methods 500 to 700. System memory 840 may be implemented using any suitable type of memory circuits including, for example, different physical, non-transient, computer-readable media, such as hard disk storage, floppy disk storage, removable disk storage, flash memory, random access memory (RAM-SRAM, EDO RAM, SDRAM, DDR SDRAM, LPDDR SDRAM, etc.), read-only memory (PROM, EEPROM, etc.), and so on. Memory circuits in computer system 800 are not limited to primary storage such as system memory 840. Rather, computer system 800 may also include other forms of storage such as cache memory in processor subsystem 820 and secondary storage in I/O devices 870 (e.g., a hard drive, storage array, etc.). In some embodiments, these other forms of storage may also store program instructions executable by processor subsystem 820.

I/O interfaces 860 may be any of various types of interfaces configured to couple to and communicate with other devices, according to various embodiments. In one embodiment, I/O interface 860 is a bridge chip (e.g., Southbridge) from a front-side to one or more back-side buses. I/O interfaces 860 may be coupled to one or more I/O devices 870 via one or more corresponding buses or other interfaces. Examples of I/O devices 870 include storage devices (hard drive, optical drive, removable flash drive, storage array, SAN, or their associated controller), network interface devices (e.g., to a local or wide-area network), or other devices (e.g., graphics, user interface devices, etc.). In some embodiments, I/O devices 870 includes a network interface device (e.g., configured to communicate over Wi-Fi®, Bluetooth®, Ethernet, etc.), and computer system 800 is coupled to a network via the network interface device.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

The present disclosure refers to various operations that are performed in the context of instructions executed by one or more computer systems. For example, methods 500-700 are described as, in some embodiments, being performed by computer system 100 as shown in various ones of FIGS. 1-4. In addition, various processes (e.g., retrieval model 120 and trained retrieval model 121 in FIGS. 1-4) are described as being performed by a computer system such as computer system 100 in FIGS. 1-4). Computer system 100 may include one or more computer systems included, for example, in one or more data centers (physical facilities that store data that drives enterprise computing applications and provides online services to users via, e.g., the Internet). These components, therefore, are implemented on physical structures (i.e., on computer hardware).

In general, any of the services or functionalities of a software development environment described in this disclosure can be performed by a host computing device, which is any computer system that is capable of connecting to a computer network. A given host computing device can be configured according to any known configuration of computer hardware. A typical hardware configuration includes a processor subsystem, memory, and one or more I/O devices coupled via an interconnect. A given host computing device may also be implemented as two or more computer systems operating together.

The processor subsystem of the host computing device may include one or more processor circuits or processing units. In some embodiments of the host computing device, multiple instances of a processor subsystem may be coupled to the system interconnect. The processor subsystem (or each processor unit within a processor subsystem) may contain any of various processor features known in the art, such as a cache, hardware accelerator, etc.

The system memory of the host computing device is usable to store program instructions executable by the processor subsystem to cause the host computing device to perform various operations described herein. The system memory may be implemented using different physical, non-transitory memory media, such as hard disk storage, floppy disk storage, removable disk storage, flash memory, random access memory (RAM SRAM, EDO RAM, SDRAM, DDR SDRAM, RAMBUS RAM, etc.), read-only memory (PROM, EEPROM, etc.), and so on. Memory in the host computing device is not limited to primary storage. Rather, the host computing device may also include other forms of storage such as cache memory in the processor subsystem and secondary storage in the I/O devices (e.g., a hard drive, storage array, etc.). In some embodiments, these other forms of storage may also store program instructions executable by the processor subsystem.

The interconnect of the host computing device may connect the processor subsystem and memory with various I/O devices. One possible I/O interface is a bridge chip (e.g., Southbridge) from a front-side to one or more back-side buses. Examples of I/O devices include storage devices (hard drive, optical drive, removable flash drive, storage array, SAN, or their associated controller), network interface devices (e.g., to a computer network), or other devices (e.g., graphics, user interface devices.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

In this disclosure, various "modules" and "models" operable to perform designated functions are shown in the figures and described in detail (e.g., retrieval model 120 and trained retrieval model 121). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

What is claimed is:

1. A method for operating, by a computer system, a semantic search engine to retrieve records from a data store, the method comprising:
    training, by the computer system using a plurality of training data sets that include queries and corresponding records, a retrieval model for use in the semantic search engine;
    generating, by the trained retrieval model, a particular output vector representing a received semantic search query;
    generating, by the trained retrieval model using the particular output vector, respective similarity scores for ones of candidate records identified in the data store;
    sending, by the trained retrieval model, the particular output vector to a late interaction model; and
    sorting, by the late interaction model using the particular output vector, candidate records with respective similarity scores that satisfy a threshold score.

2. The method of claim 1, wherein the sorting includes ranking the candidate records based on values of the respective similarity scores generated by the trained retrieval model.

3. The method of claim 1, wherein a particular one of the plurality of training data sets includes a plurality of positive query-query pairs, wherein a given positive query-query pair includes two queries that produce similar lists of candidate records.

4. The method of claim 3, wherein training, using the particular training data set, includes:
    generating, by the retrieval model, first and second output vectors for first and second queries, respectively, in a given one of the positive query-query pairs;
    comparing, by the computer system, the first and second output vectors to determine a difference; and
    revising, by the computer system, the retrieval model based on the difference.

5. The method of claim 1, wherein a particular one of the plurality of training data sets includes a plurality of positive query-record pairs, and wherein training the retrieval model includes:
generating, by the retrieval model using a given positive query-record pair, a particular similarity score based on a first output vector generated for a respective query and a second output vector for a respective record;
comparing, by the computer system, the particular similarity score to a predetermined similarity score for the given positive query-record pair in order to determine a difference; and
revising, by the computer system, the retrieval model based on the difference.

6. The method of claim 1, further comprising, in response to receiving a record to place in the data store, generating, by the computer system, a plurality of vector representations for the received record, wherein ones of the plurality of vector representations correspond to different portions of the received record.

7. The method of claim 6, wherein the generating the respective similarity scores includes determining a given one of the respective similarity scores based on a comparison of the particular output vector and a respective plurality of vector representations for a given one of the candidate records.

8. A computer-readable, non-transient memory including instructions that when executed by a computer system, cause the computer system to perform operations including:
using a plurality of training data sets that include queries and corresponding records to train a retrieval model for use in a semantic search engine;
receiving, for the semantic search engine, a search query to retrieve records from a data store;
generating a particular output vector representing the search query;
identifying, using the particular output vector, a list of candidate records in the data store; and
sorting the list of candidate records based on estimated similarity to the particular output vector.

9. The computer-readable, non-transient memory of claim 8, wherein the identifying includes selecting candidate records with respective similarity scores that satisfy a threshold score.

10. The computer-readable, non-transient memory of claim 8, wherein a particular one of the plurality of training data sets includes a plurality of positive query-query pairs, and wherein training the retrieval model includes:
generating, for a given one of the positive query-query pairs, respective output vectors;
determining a difference between the respective output vectors; and
revising the retrieval model based on the difference.

11. The computer-readable, non-transient memory of claim 8, wherein a particular one of the plurality of training data sets includes a plurality of positive query-record pairs, and wherein training the retrieval model includes:
generating a particular similarity score representing a level of similarity between a given query and a given record that are included in a particular positive query-record pair;
determining a difference between the particular similarity score and a predetermined similarity score for the particular positive query-record pair; and
revising the retrieval model based on the difference.

12. The computer-readable, non-transient memory of claim 8, wherein the operations further include, in response to receiving a record to place in the data store, generating a plurality of vector representations for the received record, wherein ones of the plurality of vector representations correspond to different portions of the received record.

13. The computer-readable, non-transient memory of claim 12, wherein the operations further include estimating a respective similarity between the particular output vector and a respective plurality of vector representations for a given one of the candidate records.

14. A method for training a retrieval model, the method comprising:
training, by a computer system using first training data that includes queries and known corresponding documents, the retrieval model for inclusion in a semantic search engine executable to retrieve records from a data store, wherein training the retrieval model generates a first revision of the retrieval model;
training, by the computer system using second training data, the first revision to generate a second revision of the retrieval model that is usable to produce similar output vectors for input queries that are semantically similar; and
training, by the computer system using third training data that includes queries and known corresponding records, the second revision to produce a trained retrieval model, wherein training the second revision of the retrieval model attempts to reduce ordering error in candidate record lists predicted by the trained retrieval model; and
in response to receiving a search query:
generating, by the trained retrieval model, a particular output vector representative of the search query; and
identifying, by the trained retrieval model using the particular output vector, a list of candidate records from the data store.

15. The method of claim 14, wherein the second training data includes sets of positive query-query pairs, wherein a given positive query-query pair includes two queries that produce similar candidate lists.

16. The method of claim 15, wherein training the first revision of the retrieval model includes:
generating, by the first revision of the retrieval model for a given one of the sets of positive query-query pairs, first and second output vectors for first and second queries, respectively;
comparing, by the computer system, the first and second output vectors to determine a difference; and
generating, by the computer system, the second revision of the retrieval model based on the first revision and the difference.

17. The method of claim 14, wherein training the second revision of the retrieval model includes:
generating, by the second revision of the retrieval model using a given positive query-record pair, a particular similarity score based on a first output vector generated for a given query and a second output vector for a given one of the known corresponding records;
comparing, by the computer system, the particular similarity score to a predetermined similarity score for the given positive query-record pair in order to determine a difference; and
generating, by the computer system, the trained retrieval model based on the second revision of the retrieval model and the difference.

18. The method of claim 14, wherein identifying the list of candidate records includes generating, by the trained retrieval model using the particular output vector, respective similarity scores for ones of the candidate records in the data store.

19. The method of claim 18, further comprising:
sending, by the trained retrieval model, the particular output vector to a late interaction model; and
sorting, by the late interaction model the list of candidate records based on the respective similarity scores.

20. The method of claim 14, further comprising, in response to receiving a record to place in the data store, generating, by the computer system, a plurality of vector representations for the received record, wherein ones of the plurality of vector representations correspond to different portions of the received record.

* * * * *